B. M. ESTERLE.
Felly-Plate.
No. 60,495.
Patented Dec. 18, 1866.
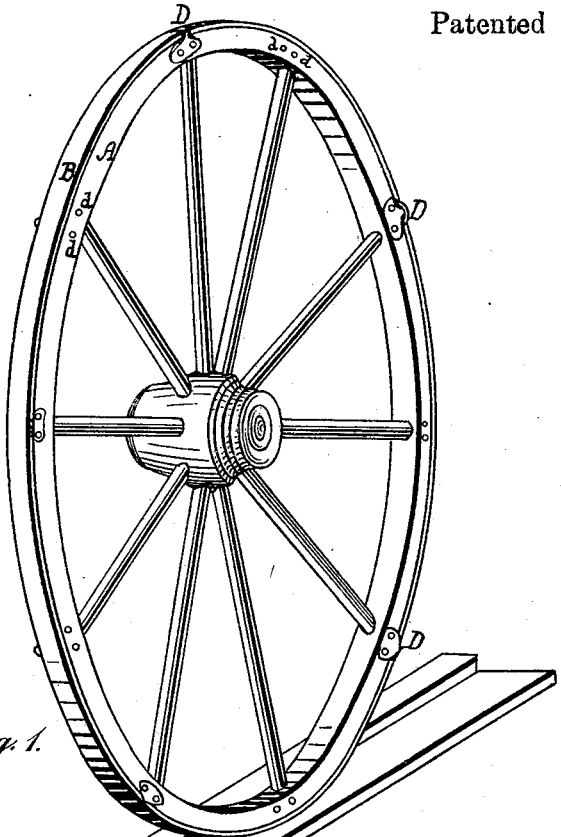
Fig. 1.
Fig. 2.
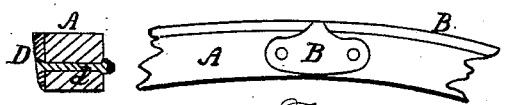
Fig. 3.
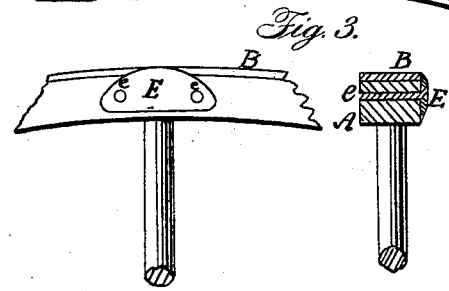
Fig. 4.
Fig. 5.
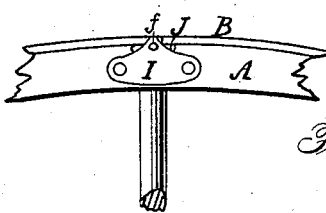
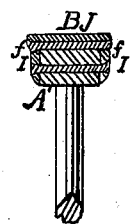
Witnesses
Inventor.
Benjn. M. Esterle

United States Patent Office.

IMPROVEMENT IN WAGON WHEELS.

BENJAMIN M. ESTERLE, OF SAN FRANCISCO, CALIFORNIA.

Letters Patent No. 60,495, dated December 18, 1866.

The Schedule referred to in these Letters Patent and making part of the same.

TO ALL WHOM IT MAY CONCERN:

Be it known that I, BENJAMIN MARK ESTERLE, of the city and county of San Francisco, State of California, have invented a certain new and useful attachment to Wagon Wheels, for turn-off on street railways; and I do hereby declare that the following is a full, clear, and exact description of the construction and operation of the same, reference being had to the accompanying drawings, making part of this specification, in which—

Figure 1 is an oblique view of hind wheel of buggy with my plates attached.

Figure 2, enlarged view of plates seen in No. 1, showing the mode of attachment.

Figure 3, form of plate attached to inside of front wheel when the tires rub against the vehicle in turning.

Figure 4, mode of attaching plates to drays and heavy freight wagons.

Figure 5, mode of attachment of plates to heavy express wagons.

The nature of my invention consists in the employment of a plate or plates for attachment to the felloes of wheeled vehicles for the purpose of enabling them to be readily turned out from or into the rail tracks ordinarily used in city horse railroads. The plates to be used vary with the vehicle, but the principle is the same; that is to say, the attachment of such plate or plates to the felloe with head coming flush with the outer periphery of the tire, as shall rest, in turning the vehicle, upon the outer rim of the track, and then serve as a fulcrum upon which the wheel may be lifted into and out of the track.

Fig. 1 shows the near hind wheel of a buggy turning out of a rail track; A, the rim of the wheel; B, the tire; C, the flange of a rail; G, the trend of a rail; D D D, plates attached to the sides of the rim in such manner that their points are flush with the outer periphery of the tire, B. For the hind wheels of buggies and light express wagons, the plates D D D are put on alternately without and within, opposite each spoke, fastened by bolts or nuts, $d\ d$.

Fig. 2 shows, on a larger scale, the mode of attachment of these plates to the above-described class of vehicles on both sides of each hind wheel, and on the outer side of front wheel. On the inner side of the front wheel of such vehicles as have tires rubbing against the body of the vehicle in turning, the front of plates shown in fig. 3 is preferred.

What I claim as my invention and improvement in carriage wheels, is—

The use of the plate E, constructed, as shown in fig. 3 of the drawings, so that it may be used on the inside of the front wheels of a wagon, and pass or slip over the lock or friction plate fastened to the carriage for the wheel to rub against in turning the wagon.

BENJA. M. ESTERLE. [L. S.]

Witnesses:
    Jos. MOSHEIMER,
    C. W. M. SMITH.